US012382017B2

United States Patent
Huang et al.

(10) Patent No.: US 12,382,017 B2
(45) Date of Patent: Aug. 5, 2025

(54) BLOCK LEVEL REFERENCE PICTURES ADAPTATION FOR VIDEO CODING

(71) Applicant: QUALCOMM Incorporated, San Diego, CA (US)

(72) Inventors: Han Huang, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 18/068,809

(22) Filed: Dec. 20, 2022

(65) Prior Publication Data

US 2023/0217012 A1    Jul. 6, 2023

Related U.S. Application Data

(60) Provisional application No. 63/343,980, filed on May 19, 2022, provisional application No. 63/324,926, (Continued)

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/513* (2014.11); *H04N 19/70* (2014.11)

(58) Field of Classification Search
None
See application file for complete search history.

(56) References Cited

U.S. PATENT DOCUMENTS 9,602,813 B2 *   3/2017   Song ................... H04N 19/105
2015/0124877 A1   5/2015   Choi et al.
(Continued)

OTHER PUBLICATIONS

An J (Hisilicon)., et al., "Enhanced Merge Mode based on JEM7.0," 10. JVET Meeting, Apr. 10, 2018-Apr. 20, 2018, San Diego, The Joint Video Exploration Team of ISO/IEC JTC1/SC29/WG11 and ITU-T SG.16, No. JVET-J0059, Apr. 3, 2018, 9 Pages, XP030151245, The whole document.

(Continued)

*Primary Examiner* — Chikaodili E Anyikire
(74) *Attorney, Agent, or Firm* — Shumaker & Sieffert, P.A.

(57) ABSTRACT

A video decoder may be configured to generate a first ordering of reference pictures in a reference picture list for a first block of a slice, wherein generating the first ordering of the reference pictures for the first block comprises assigning indexes to the reference pictures; and generate a second ordering of the reference pictures in the reference picture list for a second block of the slice based on an adaptive reference picture reordering process, wherein the first ordering is different than the second ordering and generating the second ordering of reference pictures for the second block comprises assigning at least some of the indexes to different reference pictures than in the first ordering; decode the first block using the first ordering of the reference pictures; and decode the second block using the second ordering of the reference pictures.

28 Claims, 7 Drawing Sheets

Related U.S. Application Data filed on Mar. 29, 2022, provisional application No. 63/316,102, filed on Mar. 3, 2022, provisional application No. 63/266,389, filed on Jan. 4, 2022.

(51) Int. Cl.
  *H04N 19/176* (2014.01)
  *H04N 19/513* (2014.01)
  *H04N 19/70* (2014.01)

(56) References Cited

U.S. PATENT DOCUMENTS

| | | | |
|---|---|---|---|
| 2018/0124394 | A1 | 5/2018 | Xu et al. |
| 2020/0145653 | A1* | 5/2020 | Zhu .................... H04N 19/577 |
| 2021/0044827 | A1 | 2/2021 | Wang et al. |
| 2021/0099698 | A1 | 4/2021 | Wahadaniah et al. |
| 2021/0195178 | A1 | 6/2021 | Hendry et al. |
| 2023/0156218 | A1* | 5/2023 | Zhao .................... H04N 19/109 375/240.16 |

OTHER PUBLICATIONS

Gao H., et al., "Decoder-Side Motion Vector Refinement in VVC: Algorithm and Hardware Implementation Considerations," IEEE Transactions on Circuits and Systems for Video Technology, IEEE, USA, vol. 31, No. 8, Nov. 9, 2020, XP011870333, pp. 3197-3211.

Huang H., et al., "EE2-2.1: On the Extended Number of Active Reference Pictures and Block Level Reference Picture Reordering," JVET-Z0054-v2, Joint Video Experts Team (JVET) of ITU-T SG 16 WP 3 and ISO/IEC JTC 1/SC 29, 26th Meeting, by teleconference, Apr. 20-29, 2022, pp. 1-4.

Huang H., et al., "Non-EE2: On the Extended Number of Active Reference Pictures and Reference Picture Reordering," JVET-Y0139-v3, Joint Video Experts Team (JVET) of ITU-T SG 16 WP 3 and ISO/IEC JTC 1/SC 29, 25th Meeting, by teleconference, Jan. 12-21, 2022, pp. 1-4.

Konin S., et al., "CE9: Motion Vector Difference Signs Derivation (Test 4.2)," JVET-K0067-v1, Joint Video Experts Team (JVET) of ITU-T SG 16 WP 3 and ISO/IEC JTC 1/SC 29/WG 11, 11th Meeting: Ljubljana, SI, Jul. 10-18, 2018, pp. 1-3.

International Search Report and Written Opinion—PCT/US2022/082146—ISA/EPO—Feb. 24, 2023 12 Pages.

ITU-T H.265: "Series H: Audiovisual and Multimedia Systems Infrastructure of Audiovisual Services—Coding of Moving Video," High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video," Versatile Video Coding, The International Telecommunication Union, Aug. 2020, 516 pages.

Zhang Y., et al., "Non-EE2: On MVD Sign Prediction," JVET-X0132-v1, Joint Video Experts Team (JVET) of ITU-T SG 16 WP 3 and ISO/IEC JTC 1/SC 29, JVET-X0132-v2, 24th Meeting, by teleconference, Oct. 6-15, 2021, pp. 1-4.

* cited by examiner

BLOCK LEVEL REFERENCE PICTURES ADAPTATION FOR VIDEO CODING

This application claims the benefit of:
U.S. Provisional Patent Application 63/266,389, filed Jan. 4, 2022,
U.S. Provisional Patent Application 63/316,102, filed Mar. 3, 2022,
U.S. Provisional Patent Application 63/324,926, filed Mar. 29, 2022, and
U.S. Provisional Patent Application 63/343,980, filed May 19, 2022,
the entire content of both being incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

The techniques of this disclosure are directed to inter prediction in video codecs, and more specifically, to signaling of reference pictures and management of reference picture lists for inter-coded blocks. With existing techniques, a video decoder uses high-level signaling, such as at a picture level or slice level, to maintain reference picture lists for inter prediction. These techniques, however, do not include block-level adaptations to the reference picture lists, such as reordering. Including additional signaling to enable such block-level adaptation may be undesirable because the increased signaling overhead outweighs the coding gains achieved by the reference picture list adaptation. This disclosure describes techniques for performing block-level reference picture list adaptation without increasing signaling overhead. Specifically, a video decoder may be configured to perform an adaptive reference picture reordering process to generate a new ordering of the reference pictures in a reference picture list without signaling overhead. By reordering the reference pictures in the reference picture list using an adaptive reference picture list reordering process, the bits needed for signaling which reference picture in the reference picture list is to be used for inter prediction can be reduced without increasing distortion.

According to an example of the disclosure, a method of decoding video data includes generating a first ordering of reference pictures in a reference picture list for a first block of a slice, wherein generating the first ordering of the reference pictures for the first block comprises assigning indexes to the reference pictures; decoding the first block using the first ordering of the reference pictures; generating a second ordering of the reference pictures in the reference picture list for a second block of the slice based on an adaptive reference picture reordering process, wherein the first ordering is different than the second ordering and generating the second ordering of reference pictures for the second block comprises assigning at least some of the indexes to different reference pictures than in the first ordering; decoding the second block using the second ordering of the reference pictures; and outputting decoded video data comprising decoded versions of the first block and the second block.

According to an example of the disclosure, a device for decoding video data includes a memory configured to store video data and one or more processors implemented in circuitry and configured to generate a first ordering of reference pictures in a reference picture list for a first block of a slice, wherein generating the first ordering of the reference pictures for the first block comprises assigning indexes to the reference pictures; generate a second ordering of the reference pictures in the reference picture list for a second block of the slice based on an adaptive reference picture reordering process, wherein the first ordering is different than the second ordering and generating the second ordering of reference pictures for the second block comprises assigning at least some of the indexes to different reference pictures than in the first ordering; decode the first block using the first ordering of the reference pictures; decode the second block using the second ordering of the reference pictures; and output decoded video data comprising decoded versions of the first block and the second block.

According to an example of the disclosure, a computer-readable storage medium stores instructions that when executed by one or more processors cause the one or more processors to generate a first ordering of reference pictures in a reference picture list for a first block of a slice, wherein generating the first ordering of the reference pictures for the first block comprises assigning indexes to the reference pictures; generate a second ordering of the reference pictures in the reference picture list for a second block of the slice based on an adaptive reference picture reordering process, wherein the first ordering is different than the second ordering and generating the second ordering of reference pictures for the second block comprises assigning at least some of the indexes to different reference pictures than in the first ordering; decode the first block using the first ordering of the reference pictures; decode the second block using the second ordering of the reference pictures; and output decoded video data comprising decoded versions of the first block and the second block.

According to an example of the disclosure, an apparatus for decoding video data includes means for generating a first ordering of reference pictures in a reference picture list for a first block of a slice, wherein generating the first ordering of the reference pictures for the first block comprises assigning indexes to the reference pictures; means for decoding the first block using the first ordering of the reference pictures; means for generating a second ordering of the reference pictures in the reference picture list for a second block of the slice based on an adaptive reference picture reordering process, wherein the first ordering is different than the second ordering and the means for generating the second ordering of reference pictures for the second block comprises means for assigning at least some of the indexes to different reference pictures than in the first ordering; means for decoding the second block using the second ordering of the reference pictures; and means for outputting decoded video data comprising decoded versions of the first block and the second block.

The details of one or more examples are set forth in the accompanying drawings and the description below. Other features, objects, and advantages will be apparent from the description, drawings, and claims.

DETAILED DESCRIPTION

Figure 1:
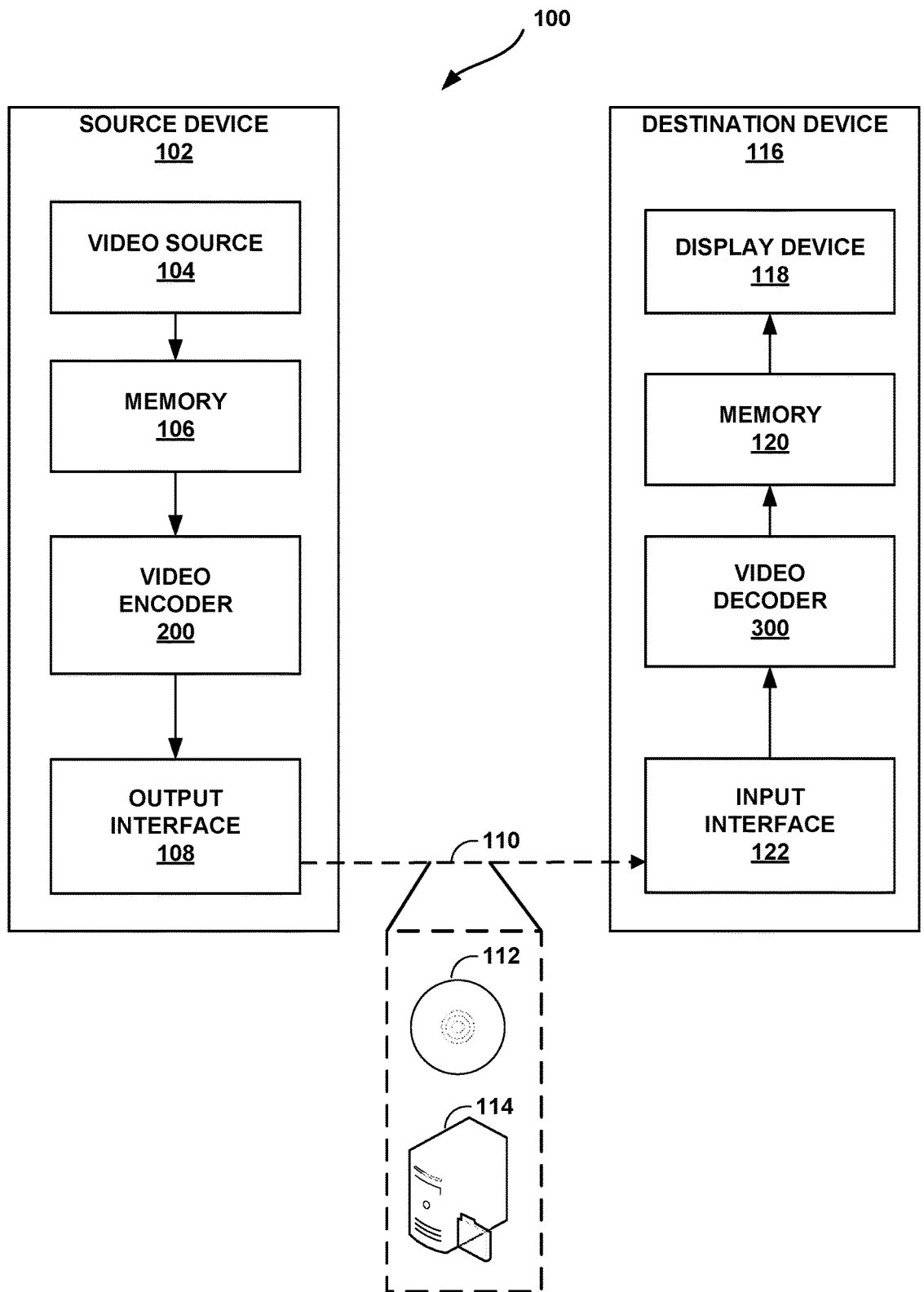
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder may perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

The techniques of this disclosure are directed to inter prediction in video codecs, and more specifically, to signaling of reference pictures and management of reference picture lists for inter-coded blocks. With existing techniques, a video decoder uses high-level signaling, such as at a picture level or slice level, to maintain reference picture lists for inter prediction. These techniques, however, do not include block-level adaptations to the reference picture lists, such as reordering. Including additional signaling to enable such block-level adaptation may be undesirable because the increased signaling overhead outweighs the coding gains achieved by the reference picture list adaptation. This disclosure describes techniques for performing block-level reference picture list adaptation without increasing signaling overhead. Specifically, a video decoder may be configured to perform an adaptive reference picture reordering process to generate a new ordering of the reference pictures in a reference picture list without signaling overhead. By reordering the reference pictures in the reference picture list using an adaptive reference picture list reordering process, the bits needed for signaling which reference picture in the reference picture list is to be used for inter prediction can be reduced without increasing distortion.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, a video encoder typically performs video decoding (also called reconstruction) as part of the processes of determining how to encode video data. For example, the block-level reference picture list management techniques described in this disclosure may be performed by both a video encoder and a video decoder, such that both the video encoder and video decoder maintain the same reference picture lists with little or no signaling overhead.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for block-level reference picture list adaptation as described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for block-level reference picture list adaptation as described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (e.g., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use reference picture lists for inter prediction.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value.

The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

For blocks coded in merge mode, video encoder 200 and video decoder 300 may be configured to maintain a candidate list, with each candidate in the list including a full set of motion information (e.g., a motion vector, a motion direction, and a reference picture index). For blocks coded in AMVP mode, video encoder 200 and video decoder 300 may be configured to similarly maintain a candidate list, but instead of full motion information, each candidate in the list only includes a motion vector predictor (MVP). Video decoder 300 may separately receive a motion vector difference (MVD) and determine the motion vector for predicting a block as the MVP plus the MVD.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an rn-bit value during quantization, where n is greater than rn. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Video codecs, such as HEVC and VVC, use inter prediction to derive prediction signals from reference pictures other than the current coded picture. The reference pictures are organized in one or two reference picture lists. The two lists are denoted as List 0 and List 1. Each reference picture list may include one or multiple reference pictures. Video encoder 200 encodes a syntax element indicating an inter prediction direction which identifies whether List 0, List 1, or both lists are used for inter prediction of the current coded block. Video encoder 200 also encodes another syntax element indicating a reference index (for each used reference list) to identify which of the reference pictures in the list is used for the inter prediction. In a merge mode, video decoder 300 derives the inter prediction direction and reference index together with the motion vector information from the selected merge candidate. In AMVP mode, additional syntax elements indicating an inter prediction direction and a reference index are signaled in the bitstream for the inter-coded block.

When signaling the inter prediction direction, video encoder 200 signals a first bin to indicate whether the inter prediction mode (e.g., the prediction direction) is a bi-prediction or uni-prediction mode. If the mode is uni-prediction, a second bin is signaled to indicate whether List 0 or List 1 is used. If the mode is bi-prediction, then the additional bin is not needed because List 0 and List 1 are both used. The corresponding reference index is signaled in the bitstream thereafter. When bi-prediction is used, both List 0 and List 1 are used for inter prediction, and reference indices for both lists need to be signaled in the bitstream. The reference index, ranging from 0 to N−1, is binarized using truncated unary coding, with N being the number of reference pictures in the list. CABAC may be applied to code some of the bins.

HEVC and VVC both support flexible reference picture structures, which can be signaled as part of high level syntax allowing each slice/picture to have different reference picture lists. That is, video encoder 200 and video decoder 300 are configured to maintain the same reference picture lists, with the same pictures and same ordering. So that video encoder 200 and video decoder 300 can maintain the same reference picture lists, video encoder 200 includes some signaling in the bitstream, video decoder 300 uses the signaling to determine which pictures and in which order to keep in the reference picture lists. The flexibility, however, is not supported at a block level due to the increased signaling overhead that would be incurred for signaling a reference picture structure for each block.

In HEVC, the spatial resolution of pictures cannot change unless a new sequence using a new SPS starts with an intra random access point (IRAP) picture. VVC enables picture resolution changes within a sequence at a position without encoding an IRAP picture, which is always intra-coded. This feature is sometimes referred to as reference picture resampling (RPR) because the feature utilizes resampling of a reference picture used for inter prediction when that reference picture has a different resolution than the current picture being decoded. In order to avoid additional processing steps, the RPR process in VVC is embedded in the motion compensation process and performed at the block level. In the motion compensation stage, the scaling ratio is used together with motion information to locate the reference samples in the reference picture to be used in the interpolation process.

In VVC, the scaling ratio is restricted to be larger than or equal to 1/2 (2 times down-sampling from the reference picture to the current picture), and less than or equal to 8 (8 times up-sampling). Three sets of resampling filters with different frequency cutoffs are specified to handle various scaling ratios between a reference picture and the current picture. The three sets of resampling filters are applied respectively for the scaling ratio ranging from 1/2 to 1/1.75, from 1/1.75 to 1/1.25, and from 1/1.25 to 8. Each set of resampling filters has 16 phases for luma and 32 phases for chroma which is same to the case of motion compensation interpolation filters. In one example, the filter set of normal MC interpolation is used in the case of scaling ratio ranging from 1/1.25 to 8. The normal MC interpolation process is a special case of the resampling process with scaling ratio ranging from 1/1.25 to 8. In addition to conventional translational block motion, the affine mode has three sets of 6-tap interpolation filters that are used for the luma component to cover the different scaling ratios in RPR. The horizontal and vertical scaling ratios are derived based on picture width and height, and the left, right, top and bottom scaling offsets specified for the reference picture and the current picture.

For support of this feature, the picture resolution and the corresponding conformance window are signalled in the PPS instead of in the SPS, while in the SPS the maximum picture resolution is signalled.

This disclosure describes techniques for block-level reference picture adaptation. Video encoder 200 and video decoder 300 may be configured to adaptively organize, e.g., without signaling overhead, the reference pictures at a block level. That is, each block may have a different ordering of reference pictures within a reference picture list. In general, the reference pictures are arranged (reordered) such that a smaller index (a smaller number of bins) is assigned to a reference picture (or a set of multiple reference pictures) that is more likely to be chosen for the current block, which may result in a reduction of the bits needed to signal a reference picture index, and thus improve overall coding performance.

Video encoder 200 and video decoder 300 may be configured to determine the likelihood for a particular reference index based on a template matching cost. For a reference picture with a higher likelihood, a smaller index may be assigned. That is, for a reference picture hypothesis with a smaller template matching cost, video encoder 200 and video decoder 300 may be configured to assign a smaller index to the associated reference picture that results in the smaller template matching cost. Video encoder 200 and video decoder 300 may be configured to calculate the template matching cost based on the distortion between the reconstruction signal of the neighboring samples in the template and a prediction signal generated by the reference hypothesis and corresponding motion information of current block. For each reference hypothesis, video encoder 200 and video decoder 300 may be configured to:

1) Given the reference hypothesis and other motion information syntax elements (e.g., MVP, MVD, motion vector resolution, etc.), derive the corresponding motion information.
2) Perform inter-prediction for the template according to the derived motion information in step (1) to generate the prediction signal of the template.
3) Obtain the reconstruction signal of the template (previously decoded neighboring samples).
4) Calculate the distortion between the reconstruction signal and the prediction signal.

With respect to step 1 above, video decoder 300 may, for example, be configured to receive syntax elements indicating an AMVP candidate and an MVD before performing block-level reference picture list adaptation. Thus, for each reference hypothesis, video decoder 300 may determine the actual motion vector to be used to predict the block and use that motion vector for determining the reference hypotheses. As different reference pictures may utilize different motion vector scaling or other reference picture-based derivation processes, the actual motion vector used for each reference hypothesis may be different even though the MVP and MVD are the same.

Using, for example, steps 1-4 above, video encoder 200 and video decoder 300 may be configured to generate a first ordering of reference pictures in a reference picture list for a first block of a slice and generate a second ordering of the reference pictures in the reference picture list for a second block of the slice. By using such an adaptive reference picture reordering process at a block level, video encoder 200 and video decoder 300 may reduce the signaling overhead associated signaling reference picture indexes in certain coding modes, such as AMVP mode.

In one example, video encoder 200 and video decoder 300 may be configured to reorder the reference pictures within each reference list separately. The syntax design for reference pictures can be the same as that of HEVC and VVC, with the difference that the same reference index value may indicate a different reference picture for different blocks.

In one example, video encoder 200 and video decoder 300 may be configured to reorder the reference pictures within both reference lists together. When signaling the inter prediction direction, in some examples, only one bin may be coded in the bitstream to indicate whether a prediction mode for a block is bi-prediction or un-prediction. In the case of a uni-prediction mode, an index ref_idx_uni may be coded in the bitstream to indicate the selected reference picture from a joint list of reference pictures that includes reference pictures from both List 0 and List 1. The reference pictures in the joint list are arranged according to the ascending order of template cost. In some examples, there may not need to be a second bin to indicate List 0 or List 1, which instead may be determined implicitly by the index. In the case of a bi-prediction mode, an index ref_idx_bi may be coded in the bitstream to indicate the selected pair of reference pictures.

In some examples, video encoder 200 and video decoder 300 may be configured to reorder the reference pictures from both reference lists together for uni-prediction mode, but reorder, within each reference list, separately for bi-prediction mode.

Video encoder 200 and video decoder 300 may be configured to determine a cost criterion. According to one example of this disclosure, the cost is the distortion between the prediction signal and reconstruction signal of the template. The distortion measure can be the Sum of Absolute Difference (SAD), Sum of the Absolute Transformed Difference (SATD), Sum of the Square Error (SSE), or another such cost determination.

In some examples, the cost may be a combination of distortion between the prediction signal and reconstruction signal of the template and a regularization term determined by the index of the reference picture hypothesis in the initial list. The regularization term can be derived as the index times a scale. The scale value can be a predetermined constant integer, or can be a value that depends on the block size.

In another example, when the coding mode is bi-prediction, video encoder 200 and video decoder 300 may be configured to determine the cost as the sum of distortions between each of the prediction signal and the reconstruction signal. The regularization term may also be applied as described above.

Video encoder 200 and video decoder 300 may be configured to perform binarization of the index. In some examples, a truncated unary code can be used to code the index. In some examples, a Golomb-Rice code can be used.

Golomb-Rice code is a variable-length coding process, formed with a truncated unary coded prefix code and a fixed-length coded suffix code. The respective lengths of the prefix and suffix codes are controlled by a parameter, coded divisor D, where D is a positive power-of-2 number (e.g., 1, 2, 4, 8, . . . ) and is not larger than the total number of symbols to be coded. When there are N different symbols to be coded by using Golomb-Rice code with a divisor D, the index of these N different symbols is decomposed into N/D groups and each group is with D symbols. The group index (e.g., 0, 1, 2, 3, . . . , N/D−1) is coded by using truncated unary code, which is the aforementioned prefix code. The index (e.g., 0, 1, 2, 3, . . . , D−1) of the D symbols in a group is then coded by using truncated binary code (when D is non-power-of-2) or fixed-length binary code (when D is a power-of-2 number), which is the aforementioned suffix code. In some examples, truncated unary code is used for ref_idx_uni, and Golomb-Rice code is used for ref_idx_bi. The number of combinations of different pairs of reference pictures in bi-prediction may be large, thus using a large number of index values. Truncated unary code, however, may not be efficient for a relatively large index value. In some examples, whether to use truncated unary code or Golomb-Rice code depends on the total number of index values. If the number is larger than a threshold, then Golomb-Rice code is used; otherwise, truncated unary code is used.

Figure 2:
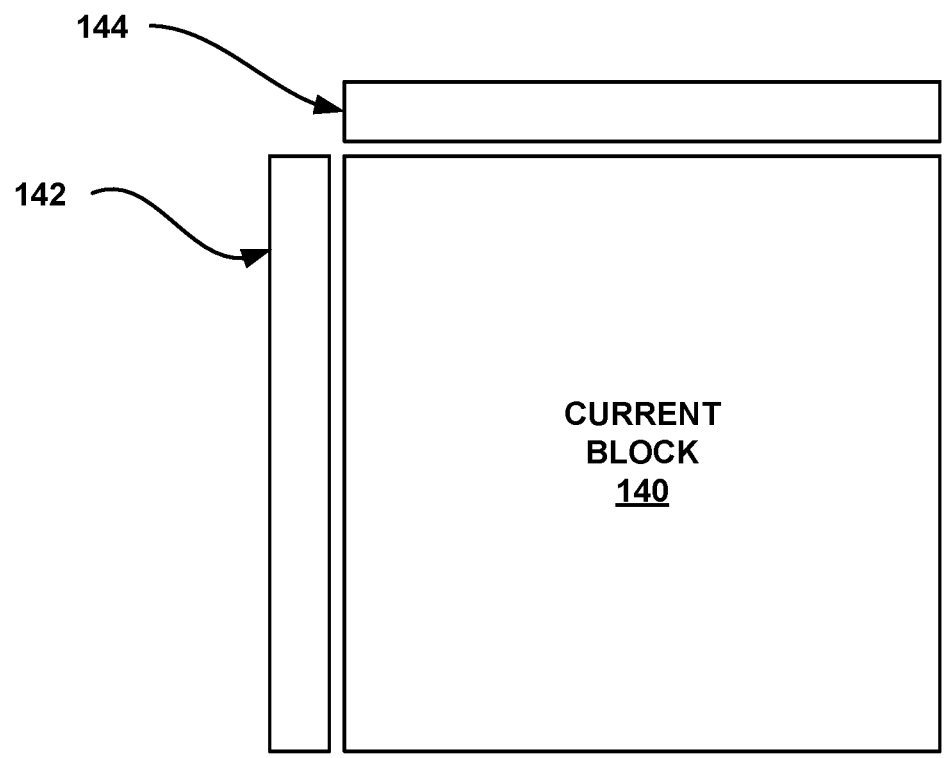
FIG. 2 shows an example of a template that may be used in conjunction with the techniques described herein.

FIG. 2 shows an example of a template. The template generally corresponds to or locates the immediate neighboring coded area of a current block, such as current block 140 in FIG. 2. The samples of the template are decoded before the current block is decoded.

In some examples, the template includes a left template 142 to the left of current block 140 and/or an above template 144 to the above of the current block 140, as illustrated in FIG. 2. If the width and height of current block 140 is denoted as W and H, then the size of the left template may be N×H, and the size of the above template size may be W×N, where N is a predefined value, such as 1, 2, 4, or some other integer value. Other templates can also be used. For example, the left template size may be N×2H, and the above template size may be 2 W×N.

Video encoder 200 and video decoder 300 may be configured to perform prediction signal generation for the template. As described above, the motion vector(s) is(are) first derived according to the reference picture hypothesis and other relative motion information, and then motion compensation is performed to generate the prediction signal for the template. Video encoder 200 and video decoder 300 may be configured to use the determined motion vector(s) to locate samples in a reference picture that correspond to the template. Video encoder 200 and video decoder 300 may then determine the template matching cost by comparing the template samples of the current picture to the corresponding samples in the reference picture.

In some examples, video encoder 200 and video decoder 300 may be configured to apply the interpolation filter used for motion compensation of a current block for motion compensation for the template. In some examples, video encoder 200 and video decoder 300 may apply a simplified interpolation filter to reduce the complexity. For example, the bilinear interpolation filter is used instead of the typical longer tap (6-tap, 8-tap, 12-tap for examples) filter. In some examples, video encoder 200 and video decoder 300 may be configured to round the motion vector(s) to the nearest integer for the motion compensation for the template.

Video encoder 200 and video decoder 300 may be configured to perform an initial list generation. The case of uni-prediction will now be described. In some examples, video encoder 200 and video decoder 300 may be configured to generate the initial joint list of reference pictures by interleaving the reference pictures from List 0 and List 1. The j reference picture in List i (i=0, 1) becomes 2*j+i reference picture in the joint list when j is less than the number of reference pictures in List 0 and is also less than the number of reference pictures in List 1. When j is larger than or equal to the number of reference pictures in List 0 or is larger than or equal to the number of reference pictures in List 1, the index in the joint list is N+j, wherein N is the minimum between the number of reference pictures in List 0 and the number of reference pictures in List 1.

In some examples, video encoder 200 and video decoder 300 may be configured to generate the initial joint list of reference pictures by first adding the reference pictures in List 0 and then adding the reference pictures in List 1. Or, in some examples, video encoder 200 and video decoder 300 may be configured to generate the initial joint list of reference pictures by first adding the reference pictures in List 1 and then adding the reference pictures in List 0. In some examples, video encoder 200 and video decoder 300 may be configured to generate the reference pictures in the joint list according to the ascending order of distance between the reference picture and current picture.

The case of bi-prediction will now be described. In one example, for the bi-prediction, video encoder 200 and video decoder 300 may be configured to generate the initial list of pairs of reference pictures as follows:

Loop over the reference picture i in the List 0
Loop over the reference picture j in the List 1
Insert the pair (i, j) into the list.

The list may be reordered according to the ascending order of i+j.

In another example, video encoder 200 and video decoder 300 may be configured to apply a sorting process thereafter, where a cost is assigned to each pair of reference pictures and the list is sorted based on the ascending order of the cost. In one example, the cost is calculated as abs(pocDist0)+abs(pocDist1)+abs(pocDist0−pocDist1). pocDist0 represents the difference of a picture order count (POC) between a current picture and reference picture 0. pocDist1 represents the difference of a POC between reference picture 1 and a current picture, and abs( ) is the operator to calculate the absolute value. In another example, the cost may be calculated as abs(pocDist0)+abs(pocDist1)+c, wherein c is set to 0 if pocDist0 and pocDist1 have different signs and is set to a predefined big positive value otherwise. In this way, the pair of reference pictures that has both forward reference pictures or both backward references is assigned a larger cost.

Video encoder 200 and video decoder 300 may be configured to handle duplicate reference pictures. A same reference picture may be inserted into both List 0 and List 1. When creating the joint list for reordering the reference pictures for uni-prediction, a duplicate reference picture may exist. In some examples, a predefined large cost may be assigned to the duplicate reference picture; for example, the cost is set to the maximum value. In some examples, the template cost for the duplicated reference picture is scaled by a predefined value, for example, 2, 4, 8, 16, etc. Similarly, the same process may be applied to the duplicate pair of reference pictures in the bi-prediction mode.

Various techniques described herein may be used in combination with sign prediction for MVDs. The signs of MVDs may be predicted based on a template matching cost, as described in JVET-X0132 (24th Meeting, by teleconference, 6-15 Oct. 2021) and JVET-K0067 (11th Meeting: Ljubljana, SI, 10-18 Jul. 2018). In some examples, the reference picture index and signs of MVDs can be coded together as an index, wherein the index value indicates a certain combination of reference picture(s) hypothesis and signs hypothesis of MVDs. All the possible combinations may be ordered according to the template matching cost as discussed above.

In some examples, sign prediction for MVDs and reference picture adaption may be mutually exclusive. The two tools can be controlled by high level syntax, and only one of the two tools can be applied to the current coded picture/slice.

In some examples, sign prediction for MVDs and reference picture adaptation are mutually exclusive at a block level. The two tools may be controlled by the magnitude of MVDs. If the magnitude of MVDs is less than some threshold, reference picture adaptation is applied; otherwise, sign prediction for MVDs is applied.

In another example, sign prediction for MVDs and reference picture adaption, as discussed above, may be used together. When performing reference picture reordering, video encoder 200 and video decoder 300 may be configured to assign the minimum cost among all possible hypothesis of MVDs to the hypothesis of reference picture(s) for the reordering of reference pictures. Then given the reordered reference picture list and the decoded index, video encoder 200 and video decoder 300 may determine the selected reference pictures, which may thereafter be used for sign prediction for the MVDs. The cost calculated during the reference picture reordering process may be stored and those associated with the determined reference pictures may be reused for sign prediction.

In another example, sign prediction for MVDs and reference picture adaption proposed, as discussed above, may be used together. When performing sign prediction for the MVDs, video encoder 200 and video decoder 300 may be configured to assign the minimum cost among all possible hypothesis of reference pictures to the hypothesis of signs for the MVDs. Then, given the reordered sign hypothesis and decoded sign index, video encoder 200 and video decoder 300 may determine the actual MVDs, which can thereafter be used for reference picture reordering. The cost calculated during the sign prediction process may be stored and those associated with the determined MVDs may be reused for reference picture reordering.

In another example, sign prediction for MVDs and reference picture adaption as proposed above may be used together. When performing reference picture reordering, video encoder 200 and video decoder 300 may assign the minimum cost among all possible hypothesis of MVD to the hypothesis of reference picture(s) for reordering of reference pictures. Then, given the reordered reference picture list and the decoded index, video encoder 200 and video decoder 300 may determine the selected reference pictures. When performing sign prediction for the MVDs, video encoder 200 and video decoder 300 may assign the minimum cost among all possible hypothesis of reference picture to the hypothesis of signs for the MVDs. Then given the reordered sign hypothesis and decoded sign index, video encoder 200 and video decoder 300 may determine the actual MVDs.

The techniques described above may be similarly applied to a combination of reference picture adaptation and other syntax prediction. The syntax may, for example, be an IMV index, a local illumination compensation (LIC) flag, a bi-prediction with CU-level weights (BCW) index, or the like.

Techniques for simplification of MVD sign prediction will now be described. As described above, the combination of reference picture reordering and MVD sign prediction may involve testing the cost of all possible combinations of different hypotheses, which could impose significant computational complexity for bi-prediction where there are multiple MVDs and especially for the affine mode when there are at most three MVDs in each directions. The following techniques may be applied to simplify the process.

In one example, video encoder 200 and video decoder 300 may be configured to disable MVD sign prediction for bi-prediction modes. A certain condition may be set for the disabling. As an example condition, the mode shall not be SMVD mode for the disabling, with MVDs in List 0 and List 1 being symmetrical. As another example condition, the mode shall be the affine mode.

In another example, video encoder 200 and video decoder 300 may be configured to disable MVD sign prediction for one of the directions in the case of bi-prediction. For example, MVD in List 1 may be disabled in the case of bi-prediction. A certain condition may be set for the disabling. For example, if MVD in List 0 is non-zero, then MVD sign prediction for List 1 is disabled. Note that the magnitudes of MVD in both directions (List 0 and List 1) can be coded beforehand, and then it can determined whether MVD sign prediction is disabled for one of the List.

In yet another example, video encoder 200 and video decoder 300 may be configured to limit the number of MVD signs to be predicted. The number may be configurable and signaled in high level syntax. In one example, a counter can be set for the MVD signs, and once the number of predicted MVD signs reaches a predefined number, then the rest of the MVD signs are coded regularly, e.g., use one bin to indicate negative or positive sign, instead of predicted. In another example, the MVDs are sorted based on the magnitudes in descending order. Then up to N MVDs in the sorted list are predicted, and the reset are not. Note that in both examples, the magnitudes of the MVDs in both List 0 and List 1 may be coded beforehand.

The techniques described above may be applied for MVD sign prediction independently or may be conditioned by whether a reference reordering technique (or other syntax element prediction technique) is applied.

Video encoder 200 and video decoder 300 may be configured to determine a bilateral matching cost for the bi-prediction mode. In the case of bi-prediction mode, a bilateral matching cost may be used, wherein the cost is the distortion between the List 0 predictor and List 1 predictor. A List 0 predictor is obtained by motion compensation using the derived motion information (according to the reference picture hypothesis) in List 0, and a List 1 predictor is obtained by motion compensation using the derived motion information (according to the reference picture hypothesis) in List 1.

In some examples, video encoder 200 and video decoder 300 may be configured to determine a bilateral matching cost instead of a template matching cost in bi-prediction mode and then use the bilateral matching cost to reorder reference picture lists. In some examples, video encoder 200 and video decoder 300 may be configured to use the bilateral matching cost together with template matching cost in bi-prediction mode. For example, video encoder 200 and video decoder 300 may be configured to reorder reference pictures based on a weighted sum of bilateral matching cost and template matching cost.

Aspects of interaction with reference picture resampling will now be described. If RPR is applied to a reference picture, typically the decoder side derivation process is disabled. For example, video decoder 300 may be configured to disable the template matching mode and Linear Illuminance Compensation (LIC) if RPR is applied to the selected reference picture. Correspondingly, the LIC flag (which indicates the on/off of LIC) is not signaled in the bitstream and is inferred to be false (off). On the other hand, the MVP index may be signaled in the bitstream instead of implicitly derived by template matching if RPR is applied to the selected reference picture. However, if the block-level reference reordering process is applied, the selected reference picture may be unknown during the parsing stage (as the reordering of reference pictures is done during the construction stage, which typically is much slower than parsing syntax element, and therefore is done way behind the parsing of the relative syntax elements). Thus, whether RPR is applied to the selected reference picture may be unknown when determining whether the LIC flag (or MVP index) is present or not. To solve such problems, techniques related to the interaction between reference picture reordering and RPR are described below.

In one example technique, video decoder 300 may configured such that reference picture reordering and RPR are exclusive. In one example, if the SPS level RPR enabling flag is true, then the SPS level reference picture reordering enabling flag is inferred to be false or constrained to be false.

In another example technique, if a reference picture or one of the reference pictures in a pair is scaled (e.g., RPR is applied), then video decoder 300 is configured to set a corresponding cost in the reference picture or reference picture pair reordering process to a maximum value. In this way, the scaled reference pictures may always be in the back of the reordered list, e.g., a scaled reference picture always has a larger index than the index of a non-scaled reference picture. At a slice or picture level, the number of non-scaled reference pictures (or reference picture pairs) may be pre-calculated, denoted as NumNonScaled. After parsing the index of selected reference picture in the reordered list, video decoder 300 may determine if the selected reference picture is a scaled picture by comparing the index value to N (without performing the reordering process). Thus, if the index is larger than or equal to NumNonScaled, then the selected reference can be determined as a scaled reference picture or otherwise determined to be non-scaled.

Figure 3:
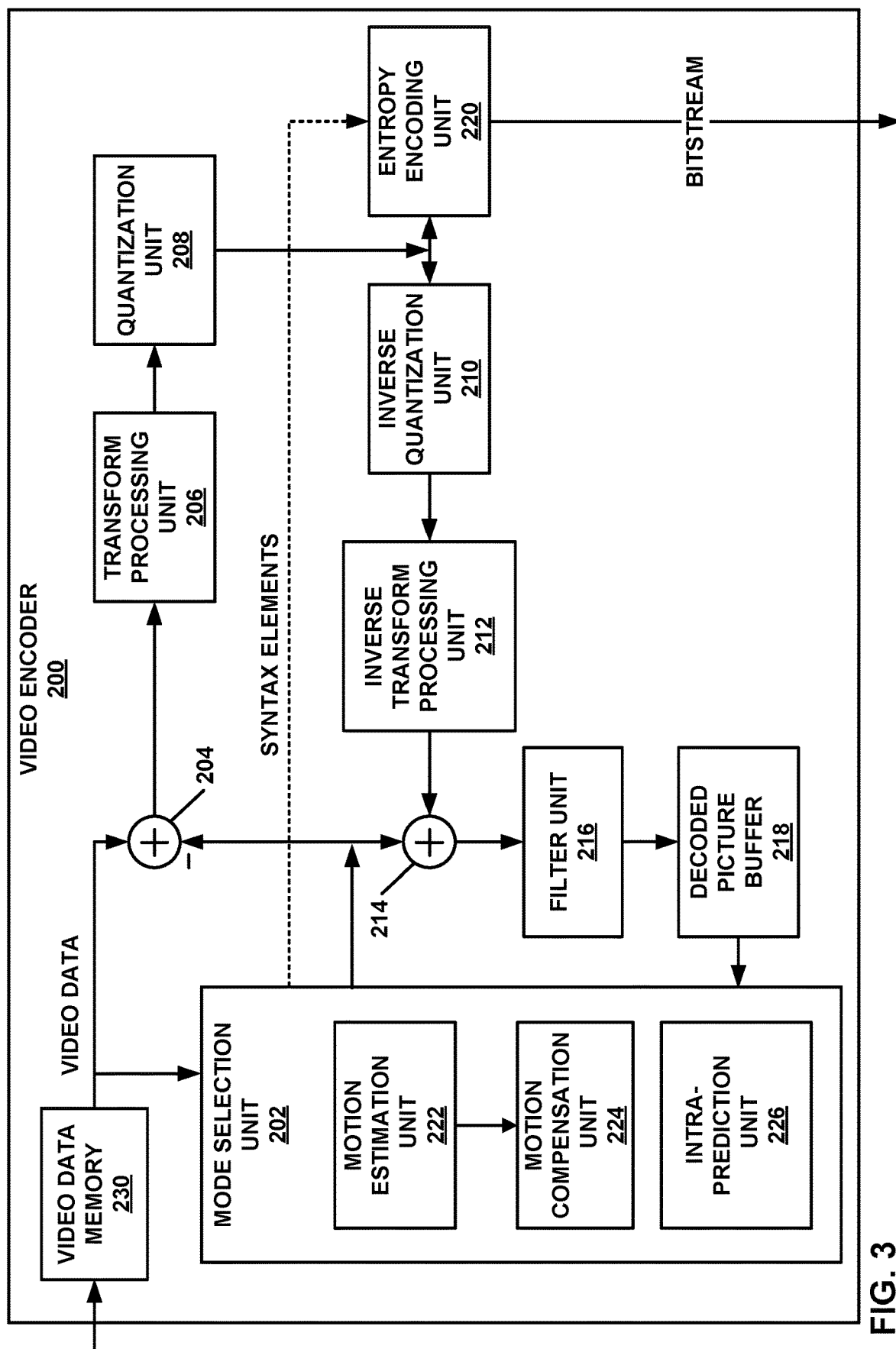
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As part of determining how to encode a block and then as part of subsequently decoding the encoded block, motion estimation unit 222 and motion compensation unit 224 may be configured to perform various techniques of this disclosure. For example, motion estimation unit 222 and/or motion compensation unit 224 may be configured to generate a first ordering of reference pictures in a reference picture list for a first block of a slice and then generate a second, different ordering of the reference pictures in the reference picture list for a second block of the slice based on an adaptive reference picture reordering process. Motion compensation unit 224 may be configured to decode the first block using the first ordering of the reference pictures and decode the second block using the second ordering of the reference pictures.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), or an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data and one or more processing units implemented in circuitry and configured to generate a first ordering of reference pictures in a reference picture list for a first block and generate a second ordering of the reference pictures in the reference picture list for a second block, wherein the first ordering is different than the second ordering.

Figure 4:
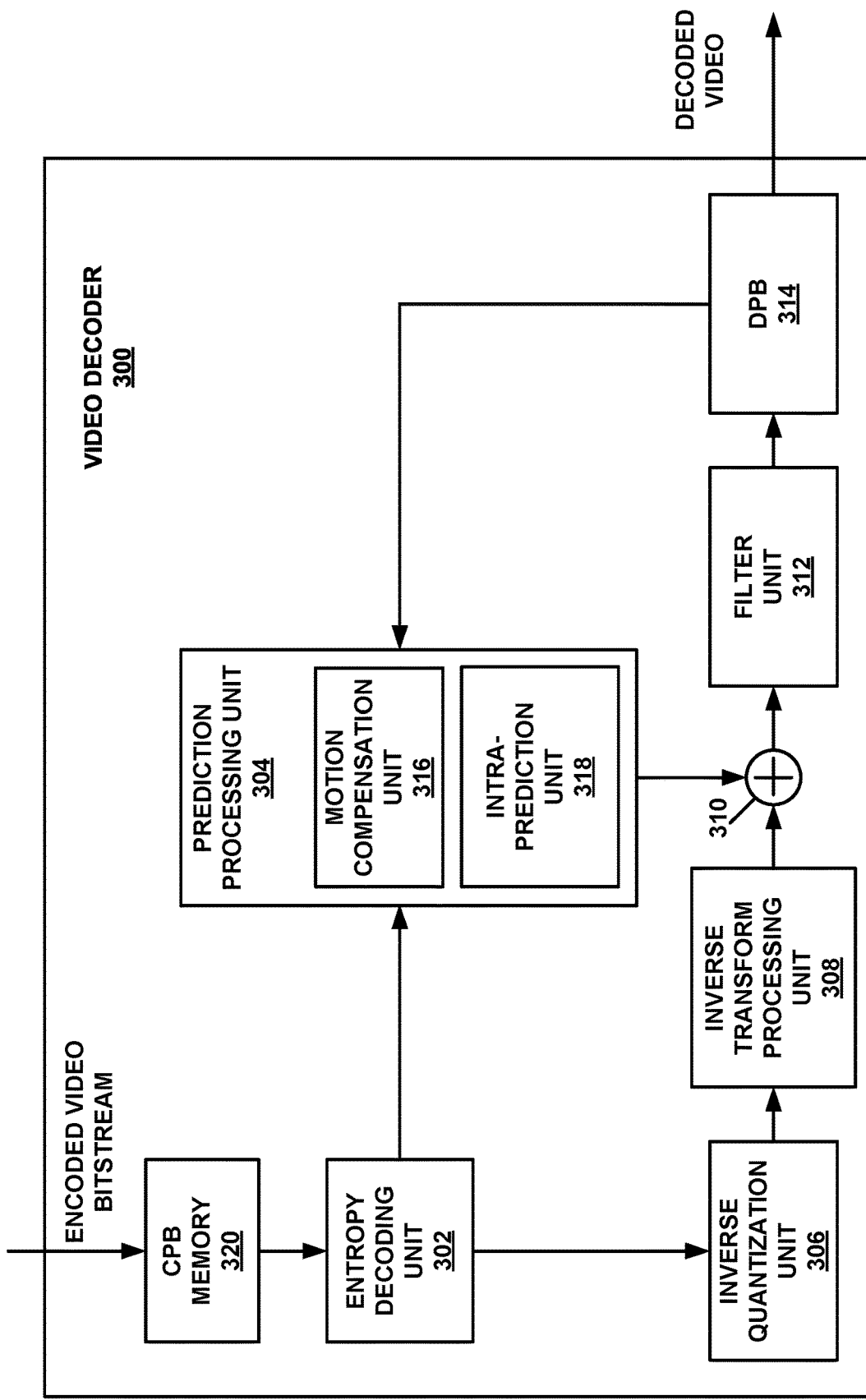
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

Motion compensation unit 316 may be configured to perform various techniques of this disclosure. For example, motion compensation unit 316 may be configured to generate a first ordering of reference pictures in a reference picture list for a first block of a slice and then generate a second, different ordering of the reference pictures in the reference picture list for a second block of the slice based on an adaptive reference picture reordering process. Motion compensation unit 316 may be configured to decode the first block using the first ordering of the reference pictures and decode the second block using the second ordering of the reference pictures.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to generate a first ordering of reference pictures in a reference picture list for a first block and generate a second ordering of the reference pictures in the reference picture list for a second block, wherein the first ordering is different than the second ordering.

Figure 5:
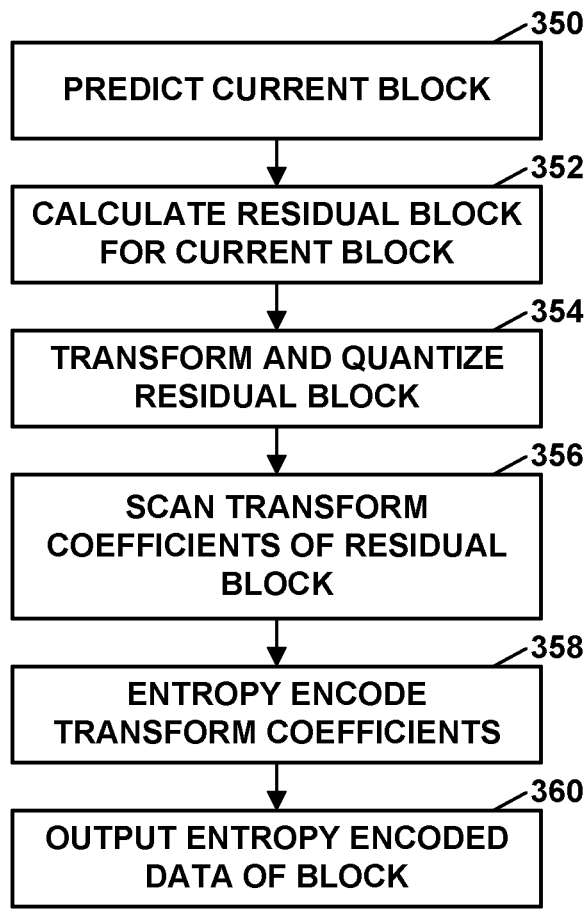
FIG. 5 is a flowchart illustrating an example process for encoding a current block in accordance with the techniques of this disclosure.

FIG. 5 is a flowchart illustrating an example process for encoding a current block in accordance with the techniques of this disclosure. The current block may comprise a current CU. Although described with respect to video encoder 200

(FIGS. 1 and 3), it should be understood that other devices may be configured to perform a process similar to that of FIG. 5.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 6:
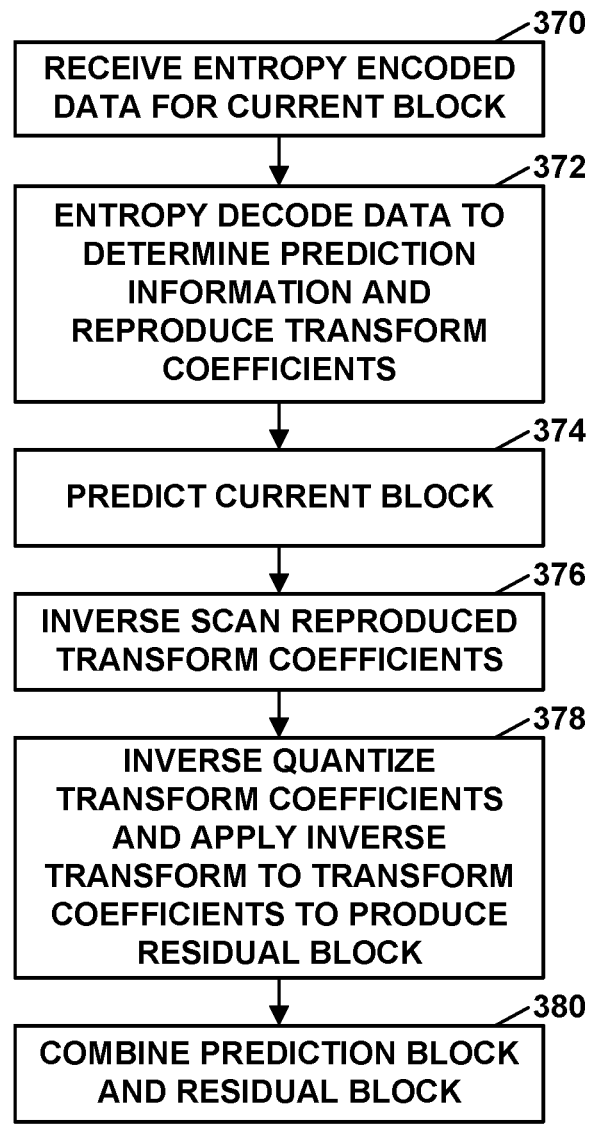
FIG. 6 is a flowchart illustrating an example process for decoding a current block in accordance with the techniques of this disclosure.

FIG. 6 is a flowchart illustrating an example process for decoding a current block of video data in accordance with the techniques of this disclosure. The current block may comprise a current CU. Although described with respect to video decoder 300 (FIGS. 1 and 4), it should be understood that other devices may be configured to perform a process similar to that of FIG. 6.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 7:
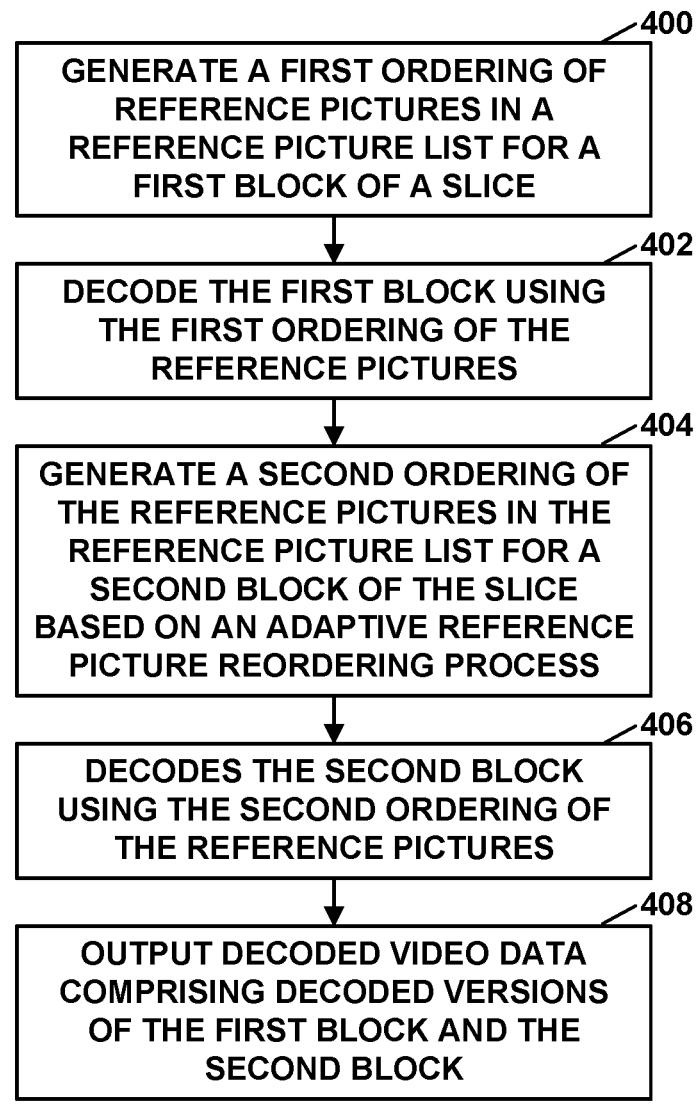
FIG. 7 is a flowchart illustrating an example process for decoding a current block in accordance with the techniques of this disclosure.

FIG. 7 is a flowchart illustrating an example process for decoding a blocks of video data in accordance with the techniques of this disclosure. The blocks may comprise a CUs. Although described with respect to video decoder 300 (FIGS. 1 and 4), it should be understood that other devices may be configured to perform a process similar to that of FIG. 7. Moreover, it should be understood that a video decoding loop of a video encoder, such as video encoder 200, may also perform the process of FIG. 7.

In the example of FIG. 7, video decoder 300 generates a first ordering of reference pictures in a reference picture list for a first block of a slice (400). To generate the first ordering of the reference pictures for the first block, video decoder 300 may assign indexes to the reference pictures.

Video decoder 300 decodes the first block using the first ordering of the reference pictures (402). To decode the first block using the first ordering of the reference pictures, video decoder 300 may, for example, determine a first reference picture for the first block based on the first ordering of the reference pictures and inter predict the first block from a block in the first reference picture. To inter predict the first block, video decoder 300 may, for example, determine a motion vector using AMVP and then use the motion vector to locate a prediction block in the first reference picture.

Video decoder 300 generates a second ordering of the reference pictures in the reference picture list for a second block of the slice based on an adaptive reference picture reordering process (404). The first block and the second block may, for example, belong to a same picture or slice and may be spatially neighboring blocks. The first ordering is different than the second ordering. To generate the second ordering of reference pictures for the second block, video decoder 300 assigns at least some of the indexes to different reference pictures than in the first ordering. In some examples, one or both of the first and the second blocks may be bi-predicted blocks, in which case video decoder 300 maintains two lists for the block and determines a final prediction block based on two prediction blocks from two different reference pictures.

As described above, in some examples, the adaptive reference picture reordering process may include a template matching process. In some examples, for bi-predicted blocks, the adaptive reference picture reordering process may include a bilateral matching process. In some examples, the adaptive reference picture reordering process may include comparing a picture order count (POC) of a picture in the first reference picture list to a POC of a picture in the second reference picture list.

Video decoder 300 decodes the second block using the second ordering of the reference pictures (406). As with the first block, to decode the second block using the second ordering of the reference pictures, video decoder 300 may, for example, determine a second reference picture for the second block based on the second ordering of the reference pictures and inter predict the second block from a block in the second reference picture. To inter predict the second block, video decoder 300 may, for example, determine a motion vector using AMVP and then use the motion vector to locate a prediction block in the second reference picture.

To decode the second block using the second ordering of the reference pictures, video decoder 300 may, for example, receiving a first syntax element identifying a motion vector predictor, a second syntax element identifying an MVD; and a third syntax element identifying an index of a reference picture in the reference picture list. Video decoder 300 determine a motion vector by adding the motion vector predictor to the MVD. Video decoder 300 may identify a reference picture in the reference picture list based on the index and the second ordering of the reference pictures, locating a prediction block in the reference picture based on the motion vector, and decode the second block using the prediction block.

Video decoder 300 outputs decoded video data comprising decoded versions of the first block and the second block (408). Video decoder 300 may, for example, output pictures of decoded video data for storage, transmission, or display. In examples, where the process of FIG. 7 is performed by a video encoder, the video encoder may output the decoded video data for storage in a decoded picture buffer so that the decoded pictures can be used to encode other pictures of the video data.

The following numbered clauses illustrate one or more aspects of the devices and techniques described in this disclosure.

Clause 1A. A method of coding video data, the method comprising: generating a first ordering of reference pictures in a reference picture list for a first block; and generating a second ordering of the reference pictures in the reference picture list for a second block, wherein the first ordering is different than the second ordering.

Clause 2A. The method of clause 1A, wherein the first block and the second block belong to a same slice.

Clause 3A. The method of clause 1A or 2A, wherein the first block and the second block belong to a same picture and are spatially neighboring blocks.

Clause 4A. The method of any of clauses 1A-3A, wherein: generating the first ordering of the reference pictures for the first block comprises assigning indexes to the reference pictures; and generating the second ordering of reference pictures for the second block comprises assigning at least some of the indexes to different reference pictures than in the first ordering.

Clause 5A. The method of any of clauses 1A-3A, wherein: generating the first ordering of the reference pictures for the first block comprises assigning indexes to the reference pictures; and generating the second ordering of reference pictures for the second block comprises assigning at least some of the indexes to different reference pictures than in the first ordering based on whether or not a reference picture has been scaled.

Clause 6A. The method of clause 1A, wherein: generating the first ordering of reference pictures in the reference picture list for the first block comprises generating the first ordering based on applying a template matching process to the reference pictures in the reference picture list; and generating the second ordering of reference pictures in the reference picture list for the second block comprises generating the second ordering based on applying the template matching process to the reference pictures in the reference picture list.

Clause 7A. The method of any of clauses 1A-6A, wherein the second block comprises a bi-predicted block.

Clause 8A. The method of clause 7A, wherein the reference picture list is a first reference picture list, the method further comprising; maintaining a second reference picture list.

Clause 9A. The method of clause 8A, wherein generating the second ordering of the reference pictures in the reference picture list for the second block comprises comparing a picture order count (POC) of a picture in the first reference picture list to a POC of a picture in the second reference picture list.

Clause 10A. The method of any of clauses 1A-9A, further comprising: determining a first reference picture for the first block based on the first ordering of the reference pictures; inter predicting the first block based on the first reference picture; determining a second reference picture for the second block based on the second ordering of the reference pictures; inter predicting the second block based on the second reference picture.

Clause 11A. The method of 10A, further comprising: determining a sign prediction for a motion vector difference based on the generating of the second ordering of the reference pictures in the reference picture list for the second block.

Clause 12A. The method of any of clauses 1A-10A, further comprising: disabling sign prediction based on a condition.

Clause 13A. The method of any of clauses 1A-10A, further comprising: in response to a number of signs predicted exceeding a threshold number, regular coding subsequent signs.

Clause 14A. A method of coding video data, the method comprising: for a plurality of blocks of video data, determining that reference picture resampling is enabled; in response to determining that that reference picture resampling is enabled, determining that reference picture reordering is disabled.

Clause 15A. The method of clause 14A, wherein determining that reference picture resampling is enabled comprises receiving a syntax element and determining that reference picture reordering is disabled comprises inferring, based on a value of the syntax element, that reference picture reordering is disabled.

Clause 16A. The method of any of clauses 1A-15A, wherein coding comprises encoding.

Clause 17A. The method of any of clauses 1A-15A, wherein coding comprises decoding.

Clause 18A. A device for coding video data, the device comprising one or more means for performing the method of any of clauses 1A-17A.

Clause 19A. The device of clause 18A, wherein the one or more means comprise one or more processors implemented in circuitry.

Clause 20A. The device of any of clauses 18A and 19A, further comprising a memory to store the video data.

Clause 21A. The device of any of clauses 18A-20A, further comprising a display configured to display decoded video data.

Clause 22A. The device of any of clauses 18A-21A, wherein the device comprises one or more of a camera, a computer, a mobile device, a broadcast receiver device, or a set-top box.

Clause 23A. The device of any of clauses 18A-22A, wherein the device comprises a video decoder.

Clause 24A. The device of any of clauses 18A-23A, wherein the device comprises a video encoder.

Clause 25A. A computer-readable storage medium having stored thereon instructions that, when executed, cause one or more processors to perform the method of any of clauses 1A-17A.

Clause 1B: A method of decoding video data, the method comprising: generating a first ordering of reference pictures in a reference picture list for a first block of a slice, wherein generating the first ordering of the reference pictures for the first block comprises assigning indexes to the reference pictures; decoding the first block using the first ordering of the reference pictures; generating a second ordering of the reference pictures in the reference picture list for a second block of the slice based on an adaptive reference picture reordering process, wherein the first ordering is different than the second ordering and generating the second ordering of reference pictures for the second block comprises assigning at least some of the indexes to different reference pictures than in the first ordering; decoding the second block using the second ordering of the reference pictures; and outputting decoded video data comprising decoded versions of the first block and the second block.

Clause 2B: The method of clause 1B, wherein the adaptive reference picture reordering process comprises a template matching process, the method further comprising: determining a template matching cost for at least a first reference picture and a second reference picture in the reference picture list; and generating the second ordering of the reference pictures in the reference picture list for the second block of the slice based on a comparison of a template matching cost for the first reference picture to a template matching cost for the second reference picture.

Clause 3B: The method of clause 1B or 2B, wherein the adaptive reference picture reordering process comprises a bilateral matching process.

Clause 4B: The method of any of clauses 1B-3B, wherein the adaptive reference picture reordering process comprises comparing a picture order count (POC) of a first picture in the reference picture list to a POC of a second picture in the reference picture list.

Clause 5B: The method of any of clauses 1B-4B, wherein the first block and the second block belong to a same picture and are spatially neighboring blocks.

Clause 6B: The method of any of clauses 1B-5B, wherein the second block comprises a bi-predicted block and the reference picture list is a first reference picture list, the method further comprising: maintaining a second reference picture list; and decoding the second block using the first reference picture list and the second reference picture list.

Clause 7B: The method of any of clauses 1B-6B, wherein decoding the first block using the first ordering of the reference pictures comprises: determining a first reference picture for the first block based on the first ordering of the reference pictures; inter predicting the first block based on the first reference picture; wherein decoding the second block using the second ordering of the reference pictures comprises: determining a second reference picture for the second block based on the second ordering of the reference pictures; inter predicting the second block based on the second reference picture.

Clause 8B: The method of any of clauses 1B-7B, further comprising: determining a sign prediction for a motion vector difference based on the generating of the second ordering of the reference pictures in the reference picture list for the second block.

Clause 9B: The method of any of clauses 1B-8B, further comprising: receiving a first syntax element identifying a motion vector predictor; receiving a second syntax element identifying a motion vector difference; and receiving a third syntax element identifying an index of a reference picture in the reference picture list; identifying a reference picture in the reference picture list based on the index and the second ordering of the reference pictures; locating a prediction block in the reference picture based on the motion vector predictor and the motion vector difference; decoding the second block using the prediction block.

Clause 10B: The method of any of clauses 1B-9B, further comprising: determining that the second block is encoded using an advanced motion vector predictor mode.

Clause 11B: The method of any of clauses 1B-8B or 10B, wherein the method of decoding is performed as part of a video encoding process.

Clause 12B: A device for decoding video data, the device comprising: a memory configured to store video data; one or more processors implemented in circuitry and configured to: generate a first ordering of reference pictures in a reference picture list for a first block of a slice, wherein generating the first ordering of the reference pictures for the first block comprises assigning indexes to the reference pictures; generate a second ordering of the reference pictures in the reference picture list for a second block of the slice based on an adaptive reference picture reordering process, wherein the first ordering is different than the second ordering and generating the second ordering of reference pictures for the second block comprises assigning at least some of the indexes to different reference pictures than in the first ordering; decode the first block using the first ordering of the reference pictures; decode the second block using the second ordering of the reference pictures; and output decoded video data comprising decoded versions of the first block and the second block.

Clause 13B: The device of clause 12B, wherein the adaptive reference picture reordering process comprises a template matching process, and the one or more processors are further configured to: determine a template matching cost for at least a first reference picture and a second reference picture in the reference picture list; and generate the second ordering of the reference pictures in the reference picture list for the second block of the slice based on a comparison of a template matching cost for the first reference picture to a template matching cost for the second reference picture.

Clause 14B: The device of clause 12B or 13B, wherein the adaptive reference picture reordering process comprises a bilateral matching process.

Clause 15B: The device of any of clauses 12B-14B, wherein the adaptive reference picture reordering process comprises comparing a picture order count (POC) of a first picture in the reference picture list to a POC of a second picture in the reference picture list.

Clause 16B: The device of any of clauses 12B-15B, wherein the first block and the second block belong to a same picture and are spatially neighboring blocks.

Clause 17B: The device of any of clauses 12B-16B, wherein the second block comprises a bi-predicted block and the reference picture list is a first reference picture list, and the one or more processors are further configured to: maintain a second reference picture list; and decode the second block using the first reference picture list and the second reference picture list.

Clause 18B: The device of any of clauses 12B-17B, wherein to decode the first block using the first ordering of the reference pictures, the one or more processors are further configured to: determine a first reference picture for the first block based on the first ordering of the reference pictures; inter predict the first block based on the first reference picture; wherein to decode the second block using the second ordering of the reference pictures the one or more processors are further configured to: determine a second reference picture for the second block based on the second ordering of the reference pictures; inter predict the second block based on the second reference picture.

Clause 19B: The device of any of clauses 12B-18B, wherein the one or more processors are further configured to: determine a sign prediction for a motion vector difference based on the generating of the second ordering of the reference pictures in the reference picture list for the second block.

Clause 20B: The device of any of clauses 12B-19B, wherein the one or more processors are further configured to: receive a first syntax element identifying a motion vector predictor; receive a second syntax element identifying a motion vector difference; and receive a third syntax element identifying an index of a reference picture in the reference picture list; identify a reference picture in the reference picture list based on the index and the second ordering of the reference pictures; locate a prediction block in the reference picture based on the motion vector predictor and the motion vector difference; decode the second block using the prediction block.

Clause 21B: The device of any of clauses 1B-202B, wherein the one or more processors are further configured to: determine that the second block is encoded using an advanced motion vector predictor mode.

Clause 22B: The device of any of clauses 12B-21B, wherein the device comprises a wireless communication device, further comprising a receiver configured to receive encoded video data.

Clause 23B: The device of clause 22B, wherein the wireless communication device comprises a telephone handset and wherein the receiver is configured to demodulate, according to a wireless communication standard, a signal comprising the encoded video data.

Clause 24B: The device of any of clauses 12B-23B, further comprising: a display configured to display decoded video data.

Clause 25B: The device of any of clauses 12B-24B, wherein the device comprises one or more of a camera, a computer, a mobile device, a broadcast receiver device, or a set-top box.

Clause 26B: The device of any of clauses 12B-25B, wherein the device comprises a camera.

Clause 27B: A computer-readable storage medium storing instructions that when executed by one or more processors cause the one or more processors to: generate a first ordering of reference pictures in a reference picture list for a first block of a slice, wherein generating the first ordering of the reference pictures for the first block comprises assigning indexes to the reference pictures; generate a second ordering of the reference pictures in the reference picture list for a second block of the slice based on an adaptive reference picture reordering process, wherein the first ordering is different than the second ordering and generating the second ordering of reference pictures for the second block comprises assigning at least some of the indexes to different reference pictures than in the first ordering; decode the first block using the first ordering of the reference pictures; decode the second block using the second ordering of the reference pictures; and output decoded video data comprising decoded versions of the first block and the second block.

Clause 28B: The computer-readable storage medium of clause 27B, wherein the adaptive reference picture reordering process comprises a template matching process, and the instructions further cause the one or more processors to: determine a template matching cost for at least a first reference picture and a second reference picture in the reference picture list; and generate the second ordering of the reference pictures in the reference picture list for the second block of the slice based on a comparison of a template matching cost for the first reference picture to a template matching cost for the second reference picture.

Clause 29B: The computer-readable storage medium of clause 27B or 28B, wherein the adaptive reference picture reordering process comprises a bilateral matching process.

Clause 30B: The computer-readable storage medium of any of clauses 27B-29B, wherein the adaptive reference picture reordering process comprises comparing a picture order count (POC) of a first picture in the reference picture list to a POC of a second picture in the reference picture list.

Clause 31B: The computer-readable storage medium of any of clauses 27B-30B, wherein the first block and the second block belong to a same picture and are spatially neighboring blocks.

Clause 32B: The computer-readable storage medium of any of clauses 27B-31B, wherein the second block comprises a bi-predicted block and the reference picture list is a first reference picture list, and the instructions further cause the one or more processors to: maintain a second reference picture list; and decode the second block using the first reference picture list and the second reference picture list.

Clause 33B: The computer-readable storage medium of any of clauses 27B-32B, wherein to decode the first block using the first ordering of the reference pictures, the instructions further cause the one or more processors are further configured to: determine a first reference picture for the first block based on the first ordering of the reference pictures; inter predict the first block based on the first reference picture; wherein to decode the second block using the second ordering of the reference pictures, the instructions further cause the one or more processors to: determine a second reference picture for the second block based on the second ordering of the reference pictures; inter predict the second block based on the second reference picture.

Clause 34B: The computer-readable storage medium of any of clauses 27B-33B, wherein the instructions further cause the one or more processors to: determine a sign prediction for a motion vector difference based on the generating of the second ordering of the reference pictures in the reference picture list for the second block.

Clause 35B: The computer-readable storage medium of any of clauses 27B-34B, wherein the instructions further cause the one or more processors to: receive a first syntax element identifying a motion vector predictor; receive a second syntax element identifying a motion vector difference; and receive a third syntax element identifying an index of a reference picture in the reference picture list; identify a reference picture in the reference picture list based on the index and the second ordering of the reference pictures; locate a prediction block in the reference picture based on the motion vector predictor and the motion vector difference; decode the second block using the prediction block.

Clause 36B: The computer-readable storage medium of any of clauses 27B-35B, wherein the instructions further cause the one or more processors to: determine that the second block is encoded using an advanced motion vector predictor mode.

Clause 37B: An apparatus for decoding video data, the apparatus comprising: means for generating a first ordering of reference pictures in a reference picture list for a first block of a slice, wherein generating the first ordering of the reference pictures for the first block comprises assigning indexes to the reference pictures; means for decoding the first block using the first ordering of the reference pictures; means for generating a second ordering of the reference pictures in the reference picture list for a second block of the slice based on an adaptive reference picture reordering process, wherein the first ordering is different than the second ordering and the means for generating the second ordering of reference pictures for the second block comprises means for assigning at least some of the indexes to different reference pictures than in the first ordering; means for decoding the second block using the second ordering of the reference pictures; and means for outputting decoded video data comprising decoded versions of the first block and the second block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    generating a first ordering of reference pictures in a reference picture list for a first block of a slice, wherein generating the first ordering of the reference pictures for the first block comprises assigning indexes to the reference pictures;
    decoding the first block using the first ordering of the reference pictures;
    generating a second ordering of the reference pictures in the reference picture list for a second block of the slice based on an adaptive reference picture reordering process, wherein the first ordering is different than the second ordering and generating the second ordering of reference pictures for the second block comprises assigning at least some of the indexes to different reference pictures than in the first ordering, wherein the adaptive reference picture reordering process comprises a template matching process, the method further comprising:
        determining a template matching cost for at least a first reference picture and a second reference picture in the reference picture list; and
        generating the second ordering of the reference pictures in the reference picture list for the second block of the slice based on a comparison of a template matching cost for the first reference picture to a template matching cost for the second reference picture;
    decoding the second block using the second ordering of the reference pictures; and
    outputting decoded video data comprising decoded versions of the first block and the second block.

2. The method of claim 1, wherein the first block and the second block belong to a same picture and are spatially neighboring blocks.

3. The method of claim 1, wherein the second block comprises a bi-predicted block and the reference picture list is a first reference picture list, the method further comprising:
    maintaining a second reference picture list; and
    decoding the second block using the first reference picture list and the second reference picture list.

4. The method of claim 1,
    wherein decoding the first block using the first ordering of the reference pictures comprises:
        determining a first reference picture for the first block based on the first ordering of the reference pictures; and
        inter predicting the first block based on the first reference picture;
    wherein decoding the second block using the second ordering of the reference pictures comprises:
        determining a second reference picture for the second block based on the second ordering of the reference pictures; and
        inter predicting the second block based on the second reference picture.

5. The method of claim 1, further comprising:
    determining a sign prediction for a motion vector difference based on the generating of the second ordering of the reference pictures in the reference picture list for the second block.

6. The method of claim 1, further comprising:
    receiving a first syntax element identifying a motion vector predictor;

receiving a second syntax element identifying a motion vector difference;

receiving a third syntax element identifying an index of a reference picture in the reference picture list;

identifying a reference picture in the reference picture list based on the index and the second ordering of the reference pictures;

locating a prediction block in the reference picture based on the motion vector predictor and the motion vector difference; and decoding the second block using the prediction block.

7. The method of claim 1, further comprising:

determining that the second block is encoded using an advanced motion vector predictor mode.

8. The method of claim 1, wherein the method of decoding is performed as part of a video encoding process.

9. A device for decoding video data, the device comprising:

a memory configured to store video data; and one or more processors implemented in circuitry and configured to:

generate a first ordering of reference pictures in a reference picture list for a first block of a slice, wherein generating the first ordering of the reference pictures for the first block comprises assigning indexes to the reference pictures;

generate a second ordering of the reference pictures in the reference picture list for a second block of the slice based on an adaptive reference picture reordering process, wherein the first ordering is different than the second ordering and generating the second ordering of reference pictures for the second block comprises assigning at least some of the indexes to different reference pictures than in the first ordering, wherein the adaptive reference picture reordering process comprises a template matching process and the one or more processors are further configured to:

determine a template matching cost for at least a first reference picture and a second reference picture in the reference picture list; and generate the second ordering of the reference pictures in the reference picture list for the second block of the slice based on a comparison of a template matching cost for the first reference picture to a template matching cost for the second reference picture;

decode the first block using the first ordering of the reference pictures;

decode the second block using the second ordering of the reference pictures; and output decoded video data comprising decoded versions of the first block and the second block.

10. The device of claim 9, wherein the first block and the second block belong to a same picture and are spatially neighboring blocks.

11. The device of claim 9, wherein the second block comprises a bi-predicted block and the reference picture list is a first reference picture list, and the one or more processors are further configured to:

maintain a second reference picture list; and decode the second block using the first reference picture list and the second reference picture list.

12. The device of claim 9, wherein to decode the first block using the first ordering of the reference pictures, the one or more processors are further configured to:

determine a first reference picture for the first block based on the first ordering of the reference pictures; and inter predict the first block based on the first reference picture;

wherein to decode the second block using the second ordering of the reference pictures the one or more processors are further configured to:

determine a second reference picture for the second block based on the second ordering of the reference pictures; and inter predict the second block based on the second reference picture.

13. The device of claim 9, wherein the one or more processors are further configured to:

determine a sign prediction for a motion vector difference based on the generating of the second ordering of the reference pictures in the reference picture list for the second block.

14. The device of claim 9, wherein the one or more processors are further configured to:

receive a first syntax element identifying a motion vector predictor;

receive a second syntax element identifying a motion vector difference;

receive a third syntax element identifying an index of a reference picture in the reference picture list;

identify a reference picture in the reference picture list based on the index and the second ordering of the reference pictures;

locate a prediction block in the reference picture based on the motion vector predictor and the motion vector difference; and decode the second block using the prediction block.

15. The device of claim 9, wherein the one or more processors are further configured to:

determine that the second block is encoded using an advanced motion vector predictor mode.

16. The device of claim 9, wherein the device comprises a wireless communication device, further comprising a receiver configured to receive encoded video data.

17. The device of claim 16, wherein the wireless communication device comprises a telephone handset and wherein the receiver is configured to demodulate, according to a wireless communication standard, a signal comprising the encoded video data.

18. The device of claim 9, further comprising:

a display configured to display decoded video data.

19. The device of claim 9, wherein the device comprises one or more of a camera, a computer, a mobile device, a broadcast receiver device, or a set-top box.

20. The device of claim 9, wherein the device comprises a camera.

21. A non-transitory computer-readable storage medium storing instructions that when executed by one or more processors cause the one or more processors to:

generate a first ordering of reference pictures in a reference picture list for a first block of a slice, wherein generating the first ordering of the reference pictures for the first block comprises assigning indexes to the reference pictures;

generate a second ordering of the reference pictures in the reference picture list for a second block of the slice based on an adaptive reference picture reordering process, wherein the first ordering is different than the second ordering and generating the second ordering of reference pictures for the second block comprises assigning at least some of the indexes to different reference pictures than in the first ordering, wherein the adaptive reference picture reordering process comprises a template matching process and the instructions further cause the one or more processors to:
  determine a template matching cost for at least a first reference picture and a second reference picture in the reference picture list; and
  generate the second ordering of the reference pictures in the reference picture list for the second block of the slice based on a comparison of a template matching cost for the first reference picture to a template matching cost for the second reference picture;
decode the first block using the first ordering of the reference pictures;
decode the second block using the second ordering of the reference pictures; and
output decoded video data comprising decoded versions of the first block and the second block.

22. The non-transitory computer-readable storage medium of claim 21, wherein the first block and the second block belong to a same picture and are spatially neighboring blocks.

23. The non-transitory computer-readable storage medium of claim 21, wherein the second block comprises a bi-predicted block and the reference picture list is a first reference picture list, and the instructions further cause the one or more processors to:
  maintain a second reference picture list; and
  decode the second block using the first reference picture list and the second reference picture list.

24. The non-transitory computer-readable storage medium of claim 21,
  wherein to decode the first block using the first ordering of the reference pictures, the instructions further cause the one or more processors are further configured to:
    determine a first reference picture for the first block based on the first ordering of the reference pictures; and
    inter predict the first block based on the first reference picture;
  wherein to decode the second block using the second ordering of the reference pictures, the instructions further cause the one or more processors to:
    determine a second reference picture for the second block based on the second ordering of the reference pictures; and
    inter predict the second block based on the second reference picture.

25. The non-transitory computer-readable storage medium of claim 21, wherein the instructions further cause the one or more processors to:
  determine a sign prediction for a motion vector difference based on the generating of the second ordering of the reference pictures in the reference picture list for the second block.

26. The non-transitory computer-readable storage medium of claim 21, wherein the instructions further cause the one or more processors to:
  receive a first syntax element identifying a motion vector predictor;
  receive a second syntax element identifying a motion vector difference;
  receive a third syntax element identifying an index of a reference picture in the reference picture list;
  identify a reference picture in the reference picture list based on the index and the second ordering of the reference pictures;
  locate a prediction block in the reference picture based on the motion vector predictor and the motion vector difference; and
  decode the second block using the prediction block.

27. The non-transitory computer-readable storage medium of claim 21, wherein the instructions further cause the one or more processors to:
  determine that the second block is encoded using an advanced motion vector predictor mode.

28. An apparatus for decoding video data, the apparatus comprising:
  means for generating a first ordering of reference pictures in a reference picture list for a first block of a slice, wherein generating the first ordering of the reference pictures for the first block comprises assigning indexes to the reference pictures;
  means for decoding the first block using the first ordering of the reference pictures;
  means for generating a second ordering of the reference pictures in the reference picture list for a second block of the slice based on an adaptive reference picture reordering process, wherein the first ordering is different than the second ordering and the means for generating the second ordering of reference pictures for the second block comprises means for assigning at least some of the indexes to different reference pictures than in the first ordering, wherein the adaptive reference picture reordering process comprises a template matching process and the means for generating the second ordering of the reference pictures further comprises:
    means for determining a template matching cost for at least a first reference picture and a second reference picture in the reference picture list; and
    means for generating the second ordering of the reference pictures in the reference picture list for the second block of the slice based on a comparison of a template matching cost for the first reference picture to a template matching cost for the second reference picture;
  means for decoding the second block using the second ordering of the reference pictures; and
  means for outputting decoded video data comprising decoded versions of the first block and the second block.

* * * * *